United States Patent [15] 3,665,171
Morrow [45] May 23, 1972

[54] NONRECURSIVE DIGITAL FILTER APPARATUS EMPLOYING DELAYED-ADD CONFIGURATION

[72] Inventor: John Phillip Morrow, Chatham, N.J.

[73] Assignee: Bell Telephone Laboratories, Incorporated, Murray Hill, N.J.

[22] Filed: Dec. 14, 1970

[21] Appl. No.: 97,594

[52] U.S. Cl. ..............................235/152, 235/156, 235/181, 235/197, 340/15.5 DP, 340/15.5 CF

[51] Int. Cl. .......................................G06f 7/38, G06f 15/34

[58] Field of Search .........................235/152, 156, 181, 197; 340/15.5 DP, 15.5 CF

[56] References Cited

UNITED STATES PATENTS

| | | | |
|---|---|---|---|
| 3,553,606 | 1/1971 | Port | 235/181 X |
| 3,521,041 | 7/1970 | Van Blerkom et al. | 235/156 |
| 3,521,042 | 7/1970 | Van Blerkom et al. | 235/156 |
| 3,518,414 | 6/1970 | Goodman et al. | 235/156 X |
| 3,303,335 | 2/1967 | Pryor | 235/152 X |
| 3,543,012 | 11/1970 | Courtney | 235/197 |

*Primary Examiner*—Malcolm A. Morrison
*Assistant Examiner*—James F. Gottman
*Attorney*—R. J. Guenther and William L. Keefauver

[57] ABSTRACT

By selectively altering the delay introduced by each of the delay units of a nonrecursive digital filter and by employing an alternating series of two-input adders and partial sum delay units to perform the required addition of weight signal samples, the components of nonrecursive digital filters can be considerably simplified. In particular, the large adder required in prior art filters is eliminated.

8 Claims, 7 Drawing Figures

INVENTOR
J. P. MORROW
BY G. E. Murphy
ATTORNEY

NONRECURSIVE DIGITAL FILTER APPARATUS EMPLOYING DELAYED-ADD CONFIGURATION

GOVERNMENT CONTRACT

The invention herein claimed was made in the course of or under a contract with the Department of the Navy.

BACKGROUND OF THE INVENTION

This invention relates to signal filtering apparatus and, more particularly, to the class of discrete-time signal filters known as nonrecursive digital filters. For a general discussion of digital filters and some of their applications, reference is made to *Digital Processing of Signals* by B. Gold and C. M. Rader (McGraw-Hill Book Company, 1969). The principles of this invention also have application to other signal processing apparatus having configurations similar to that of nonrecursive digital filters, e.g., sampled data filters and transversal equalizers.

DESCRIPTION OF THE PRIOR ART

Digital filters process information by performing a predetermined set of arithmetic operations on digitally coded samples of that information. In conventional digital filters the information to be processed is sampled at a constant rate and each sample converted to a digital word, usually consisting of a number of binary digits (bits). Signals representative of these digitally coded samples are applied to the digital filter at the sampling rate, the reciprocal of which is the sampling interval.

The digital filter itself generally comprises delay units (shift registers), amplifiers (multipliers), and adders. In the form called canonic by Gold and Rader (see FIG. 2.20 on page 42 of the above reference) and called canonical direct by some other authors (see, for example, "Digital Filters with Multiple Shift Sequences" by Tore Fjallbrant, *Ericsson Technics*, Vol. 26 (1970), No. 1, pp. 3–21, particularly page 6 and FIG. 2, page 7), the delay units in the filter network are connected in series, each having capacity for the storage of one digital word. From each interconnection of the delay units there is, in general, one signal path leading back to a first adder, to which the signal samples are also applied, and one signal path leading forward to a second adder. Each of these signal paths includes a multiplier for multiplying the digital words applied thereto by an appropriate filter coefficient. The digitally coded output signal of the first adder is applied to the first delay unit in the series of delay units and the digital words represented by that signal are shifted forward from one register to the next at the sampling rate. The digitally coded output signal of the second or feed-forward adder is the output signal of the filter. The digital words represented by this signal likewise appear at the sampling rate.

Among the advantages of digital filters as signal processing devices is the fact that one such filter can be used to process data from several sources or channels simultaneously. This is generally accomplished by applying samples from each of the sources to the filter in a predetermined sequence (i.e., by time division multiplexing of the samples). Each delay unit is extended to provide capacity for the simultaneous storage of one sample from each source. If the filter coefficients remain constant, data from all sources will be subjected to the same filter function. By providing several sets of filter coefficients, it is possible to process data from each source using a different transfer function. Other than extending the capacity of the delay units, no other changes in filter configuration are necessitated by multiplexing.

The complexity of the filter transfer function or functions to be realized determines the complexity of the required filter network. The more complex the transfer functions, the more delay units and signal paths are required in the filter. Since, as has been mentioned, such a filter will in general include two adders, each of which must be capable of forming the sum of a plurality of simultaneously applied digital words corresponding in number to the number of delay units in the filter, the complexity of these adders is directly dependent on the complexity of the filter functions to be realized.

As discussed in "An Approach to the Implementation of Digital Filters" by L. B. Jackson et al. (*IEEE Transactions on Audio and Electroacoustics*, Vol. AU–16, No. 3, Sept. 1968, pp. 413–421), the filter organization discussed above (i.e., the canonical direct form) is in fact rarely used in the general case because accuracy requirements on the filter coefficients are usually too severe. Other forms (for example, the cascade form shown in FIG. 2 in the reference by Jackson et al.) have therefore been developed in which these accuracy requirements are eased and in which the required addition operations can be readily decomposed into easily managed subsets should the order of the filter make it expedient to do so. In the cascade form, for example, it is a relatively simple matter to add an additional unit of delay between one or more of the second order filter sections, thereby allowing a series of summations which would otherwise have to take place during one cycle of filter operation to take place during two or more such intervals.

For one important class of digital filters, however, the canonical direct form (equivalent, in this case, to the direct form) is not only satisfactory, it is preferred. This is the class of filters known as nonrecursive filters, i.e., those with only feed-forward signal paths or taps. Nonrecursive filters are unique in that the phase and frequency responses of such filters can be independently specified. Frequently, however, nonrecursive filters must include a relatively large number of feed-forward signal paths. Thus, although the first or feedback adder of the general filter configuration discussed above is entirely absent from a nonrecursive filter network, the remaining adder (i.e., the second or feed-forward adder) must often be exceedingly complex, being required to form a sum of from 30 to 50 simultaneously applied signal quantities. Since only one filter cycle can be allowed for formation of this sum, the complexity of the required adder may limit the speed at which the filter can be made to operate. In addition, to achieve the fastest, most efficient summation, such adders must be designed with a specific capacity in mind. Accordingly, the most efficient adders are neither readily adaptable to a variety of uses nor can filters employing such adder configurations be constructed of standardized subunits or modules.

It is therefore an object of this invention to provide a new configuration for nonrecursive digital filters.

It is another object of this invention to provide an improved direct form for nonrecursive digital filters.

It is yet another object of this invention to provide a configuration for nonrecursive digital filters wherein the size of such filters is not limited by the complexity of the required summation of weighted signal samples.

It is a further object of this invention to provide a nonrecursive digital filter configuration in which there is no necessity for forming the sum of a large number of simultaneously generated quantities.

It is yet another object of this invention to provide a direct form for nonrecursive digital filters whereby such filters can be made up of an arbitrary number of standardized filter modules.

The principles of this invention are also applicable to nonrecursive digital filters the coefficients of which are even- or odd-symmetric about a center time domain filter coefficient. In such filters it is well known that samples applied to each pair of signal paths symmetrically placed with respect to the center path can be added, if there is even-symmetry, or subtracted, if there is odd-symmetry, before multiplication by the appropriate filter coefficient. This modification of the direct form of the nonrecursive filter reduces by nearly one-half the number of products which must be simultaneously summed. The remaining number of products may still, however, be inconveniently large for rapid summation.

It is therefore still another object of this invention to provide a nonrecursive digital filter configuration for filters having even- or odd-symmetric transfer functions in which there is no necessity for forming the sum of a large number of simultaneously generated quantities.

SUMMARY OF THE INVENTION

These and other objects of this invention are accomplished by adding one additional filter cycle interval of delay to each of the sample delay units of a nonrecursive digital filter and by replacing the large adder of prior art nonrecursive digital filters with an alternating series of serially connected partial sum delay units and two-input adders, the adders in this alternating series comprising an ordered series the elements of which correspond to the ordered series of sample delay units. Each partial sum delay unit delays the quantity applied to it for one filter cycle interval before applying that quantity to one input of the succeeding two-input adder. The other input of each adder is connected to the output of the multiplier operating on signals produced by the corresponding sample delay unit. The sum produced by each two-input adder is applied to the succeeding partial sum delay unit. The output of the last adder in the alternating series of partial sum delay units and adders is the output signal of the filter.

By virtue of the added interval of delay in each of the sample delay units, the samples relevant to the formation of any given output word appear at the sample delay unit interconnections one at a time, in sequential filter cycles, rather than simultaneously as in prior art filters. Since each sample is multiplied by the appropriate filter coefficient as it appears, a sum of the resulting products can be formed cumulatively, i.e., over as many filter cycles as there are products to be summed. This cumulative addition is performed by the above-mentioned alternating series of partial sum delay units and two-input adders.

In the cases of nonrecursive filters with even- or odd-symmetric time domain filter coefficients and therefore arranged in the modified direct form well known for such filters and discussed above, the principles of this invention are equally applicable. In these cases, one filter cycle interval of delay is added to each of the sample delay units up to and including the center delay unit. The delay introduced by each of the remaining sample delay units is shortened by a corresponding interval. The large adder of prior art filters is then replaced by an alternating series of partial sum delay units and two-input adders, there being one delay unit and one two-input adder for each shift register to which an extra delay interval has been added. The apparatus is otherwise arranged as in the case of nonsymmetric nonrecursive filters, the output of the final two-input adder constituting the output signal of the filter.

All of the foregoing filter configurations can be further modified in accordance with the principles of this invention to minimize overall filter delay. Where this is of concern, the other objects of this invention can be realized without undue increase in overall delay by adjusting the delay introduced by each sample delay unit as discussed above in only selected filter sections. It is then necessary to have only as many partial sum delay units as there are sample delay units with increased delay. Overall filter delay is therefore only slightly increased.

Further features and objects of this invention, its nature, and various advantages, will be more apparent upon consideration of the attached drawing, wherein like elements are similarly numbered, and the following detailed description of the invention.

DETAILED DESCRIPTION OF THE INVENTION

Figure 1:
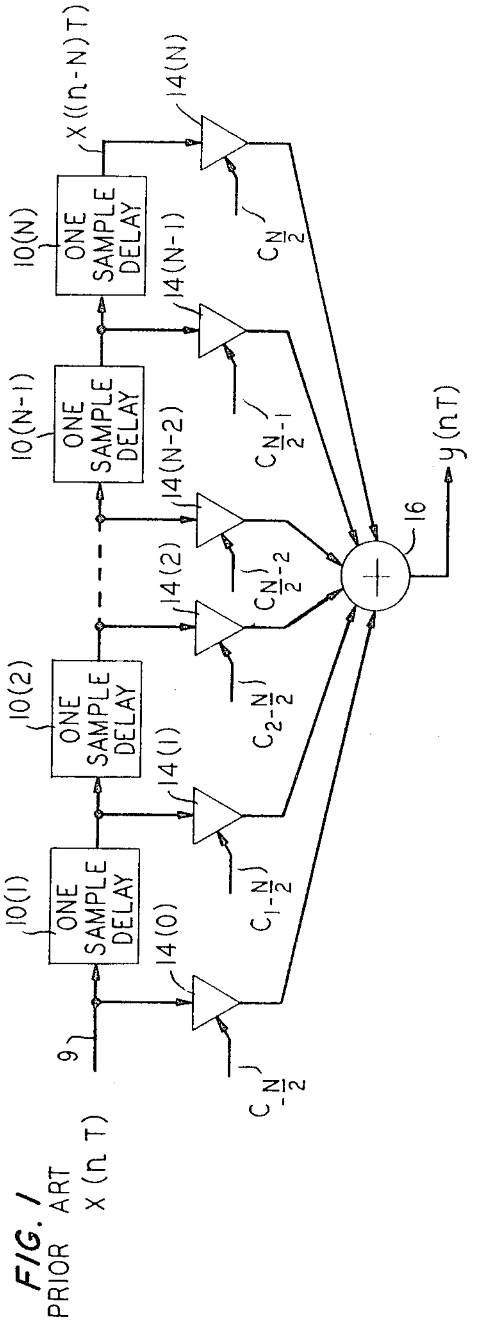
FIG. 1 PRIOR ART
FIG. 1 is a block diagram of a prior art one-channel nonrecursive digital filter.

In the one channel prior art nonrecursive digital filter of FIG. 1, signals representative of sequential digitally coded samples, $x(nT)$, of the information to be processed by the filter are applied to input lead 9 as shown. As is indicated by the designation $x(nT)$, these samples are taken at integer multiples of the sampling interval T, i.e., at time $t=nT$ for $n=0, 1, 2, \ldots$. Each sample is applied to multiplier 14(0) and to one-sample delay unit 10(1). Multiplier 14(0) multiplies the applied samples by digitally coded coefficient $C_{-(N/2)}$ and applies the resulting products to adder 16. Adder 16 combines each product generated by multiplier 14(0) with N other products simultaneously generated as discussed below. The output signal of adder 16, $y(nT)$, is the filtered output signal of the apparatus and, as suggested by its designation, is also representative of digitally coded words appearing at the sampling rate.

Samples applied to one-sample delay unit 10(1) are delayed by the time, $\tau$, required for one filter cycle and then applied to multiplier 14(1) and one-sample delay unit 10(2). In the case of one channel filters like the filter of FIG. 1, $\tau$ is equal to the sampling interval T. Multiplier 14(1) performs a function similar to multiplier 14(0), multiplying each sample applied to it by filter coefficient $C_{1-(N/2)}$ and applying the resulting product to adder 16. One-sample delay unit 10(2), similar to delay unit 10(1), delays each sample applied to it by one filter cycle interval $\tau$ before applying it to the next multiplier, i.e., multiplier 14(3), and the next one-sample delay unit, i.e., delay unit 10(3), in the progression of multipliers and delay units. All of devices 10 and 14 being respectively similar, they all perform in like fashion. Thus each sample applied to the filter is delayed for one filter cycle interval $\tau$ by each of delay units 10 and is, in addition, multiplied by each of N+1 filter coefficients, designated $C_{-(N/2)} \ldots C_0 \ldots C_{(N/2)}$, by means of multipliers 14, one such multiplication taking place in each of N+1 successive filter cycles. Accordingly, during any given sampling interval $nT$, each of a given sample $x(nT)$ and the N immediately preceding samples is multiplied by a distinct one of coefficients C. The N+1 digitally coded products that simultaneously result are summed by adder 16 to produce digitally coded output word $y(nT)$. Thereafter, one-sample delay unit 10(1) stores the most recently applied sample, $x(nT)$, while each of the N previously stored samples is shifted one delay unit to the right, the oldest stored sample, $x((n-N)T)$, being lost or discarded.

As is well known, filters of the type shown in FIG. 1 and, for that matter, in the remaining figures as well may be implemented using devices which perform either serial or parallel arithmetic. Since the principles of this invention are equally applicable in either case, it will not be necessary to particularize in this regard. The devices suitable for implementation of either serial or parallel filters are equally well known. Digital delay lines and bistable multivibrators are commonly used for delay units while any of several types of multipliers can be employed to perform the necessary multiplications. There are also several well known types of adders suitable for use in summing the simultaneously generated products.

It is also well known that the coefficients C required to realize any desired nonrecursive filter transfer function can be derived in any of several ways, e.g., by means of the $z$ transform or the inverse discrete Fourier transform. In the latter case, the nonrecursive filter may be viewed as performing a convolution of applied samples with a series of time domain filter coefficients. It will be assumed in this specification that the filter coefficients mentioned herein have been derived in this manner. It is not, of course, necessary to the application of the principles of this invention that this be the case.

Figure 2:
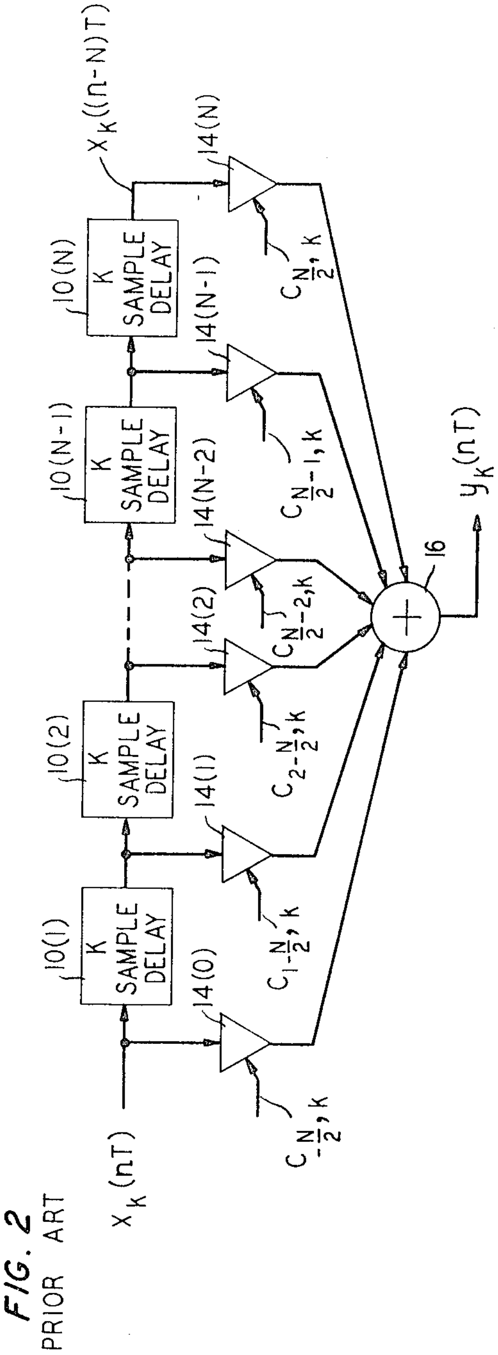
FIG. 2 PRIOR ART
FIG. 2 is a block diagram of a prior art K-channel nonrecursive digital filter.

An important feature of filters which operate on signal samples appearing in discrete time intervals is the possibility of using one filter to simultaneously process samples from a number of data sources or channels. As shown in FIG. 2, a nonrecursive digital filter can be made suitable for processing samples from as many as K sources by making the delay introduced by each of delay units 10 equal to that required for performing the operations discussed above on data from each of the K sources, i.e., for K filter cycle intervals $\tau$ or for a period of time equal to K times $\tau$. At time $t=n\mathrm{T}$ all K sources are sampled. The K samples, $x_k(n\mathrm{T})$ where subscript $k$ identifies the source of each sample, are sequentially applied to the filter in K successive filter cycle intervals as shown in FIG. 2. The one-sample delay units of the filter of FIG. 1 are replaced by multistage delay units which are K samples in length and which therefore delay each sample applied thereto by K filter cycle intervals or a period of time $\mathrm{K}\tau$. Thus in any given filter cycle interval $n\mathrm{T}+K\tau$, when the most recent sample, $x_k(n\mathrm{T})$, from source $k$ is present at the filter input, the N previous samples from source $k$ are present in the final or output stages of K-sample delay units 10(1) through 10(N). These samples are multiplied by appropriate coefficients C and the resulting products summed to produce an output word $y_k(n\mathrm{T})$ in a manner similar to the operation of the filter of FIG. 1. The filter of FIG. 1 is therefore merely a special case of the filter of FIG. 2 with K equal to 1. If the coefficients remain constant in the filter of FIG. 2, then data from all sources will be subjected to the same filter function. By providing K sets of coefficients it is possible to process data from each channel using a different filter characteristic. The coefficients C in FIG. 2 have been given the additional subscript $k$ to indicate this latter possibility.

As has been discussed, filters like those of FIGS. 1 and 2 may include any number of delay units 10 and multipliers 14. As the number of these components increases, the number of simultaneously generated products to be added by adder 16 also increases. In order to realize many necessary filter functions, the size of the required adder is impractically large.

Figure 3:
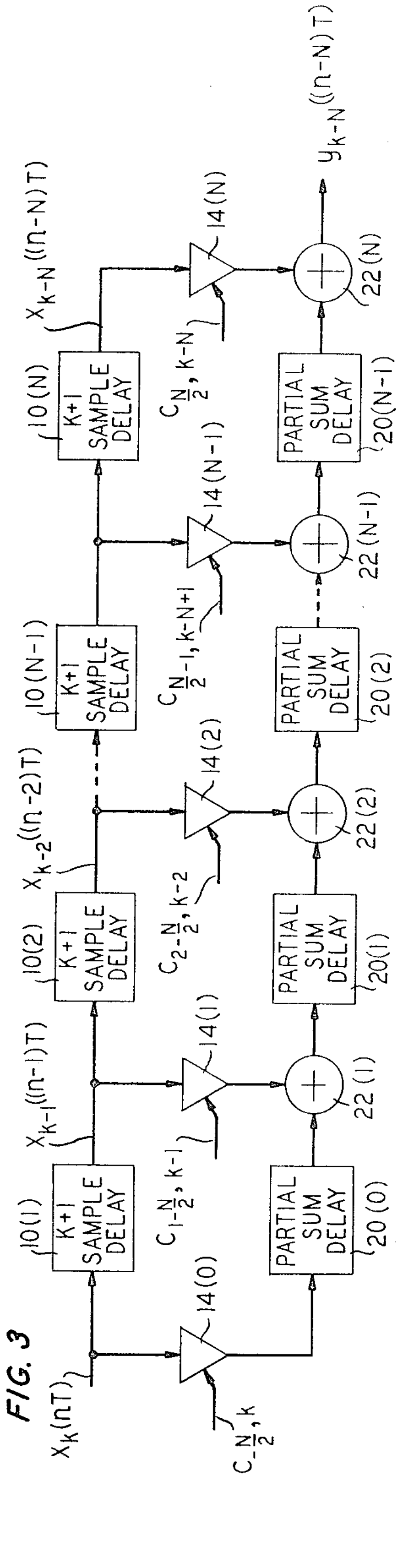
FIG. 3 is a block diagram of a K-channel nonrecursive digital filter constructed in accordance with the principles of this invention.

FIG. 3 therefore illustrates a nonrecursive filter, constructed in accordance with the principles of this invention, wherein it is not necessary for large numbers of simultaneously generated quantities to be added together. Although the filter of FIG. 3 is designed to process samples from K sources just as the filter of FIG. 2 does, it will be clear that the filter of FIG. 3 can be also used to process samples from a single source by letting K equal 1.

In the filter of FIG. 3, samples $x_k(n\mathrm{T})$ from K sources are applied to the filter in a sequence identical to that discussed in connection with the filter of FIG. 2. Each sample is delayed by each of (K+1)-sample delay units 10 for (K+1)-filter cycle intervals, i.e., for a period of time $(\mathrm{K}+1)\tau$. This is, of course, one more filter cycle interval of delay than that introduced by the delay units of the comparable prior art apparatus shown in FIG. 2. Accordingly, each of the (K+1)-sample delay units 10 in FIG. 3 can be a multistage shift register K+1 samples in length. These serially connected delay units may also be viewed as a delay line with appropriately spaced taps. Instead of samples from one source appearing simultaneously in the output stages of all of delay units 10 as is the case in the prior art filter of FIG. 2, in the filter of FIG. 3 the simultaneously appearing samples, considering the most recent first, are attributable to the several sources represented in a sequence which is the reverse of the sequence in which the sources are sampled. Accordingly, as sample $x_k(n\mathrm{T})$ is applied to the filter, sample $x_{k-1}((n-1)\mathrm{T})$ appears in the final stage of delay unit 10(1), sample $x_{k-2}((n-2)\mathrm{T})$ appears in the final stage of delay unit 10(2), and so on through delay unit 10(N), in the output stage of which sample $x_{k-N}((n-\mathrm{N})\mathrm{T})$ appears.

Each of these samples is multiplied by an appropriate filter coefficient C in the one of multipliers 14 connected to the delay unit output stage in which the sample appears. As indicated by the subscripts associated with the C's in FIG. 3, it is necessary to associate the coefficient from the correct set of coefficients with each sample where samples from several sources are being processed using different sets of coefficients. Thus sample $x_k(n\mathrm{T})$, applied to multiplier 14(0), must be multiplied by filter coefficient $\mathrm{C}_{-(N/2),\,k}$ while sample $x_{k-1}((n-1)\mathrm{T})$, applied to multiplier 14(1), is being multiplied by coefficient $\mathrm{C}_{1\,-(N/2),\,k-1}$ and so on. This can be easily accomplished in the apparatus employed to apply the coefficients to multipliers 14. Where samples from all sources are to be processed using the same set of filter coefficients, there is no problem of ordering the coefficients applied to each multiplier.

Each of the products produced by multipliers 14 is applied to one input of a simple two-input adder 22 with the exception of the product produced by multiplier 14(0) which need not be applied to such an adder. In the interest of standardizing the filter elements, however, even the product from multiplier 14(0) may be applied to a two-input adder if signals representative of zero are simultaneously applied to the other adder input. The output of each of two-input adders 22 is applied to the input of a partial sum delay device 20. Each of the partial sum delay devices 20 delays each digital word applied to it by one filter cycle interval $\tau$ before applying that word to the remaining input of the next two-input adder 22. Each of partial sum delay devices 20 may therefore be a digital delay line, shift register, or the like.

Viewed another way, the addition of one filter cycle of delay to each of delay units 10 means that the N stored signal samples relevant to the computation of any output word $y_k(n\mathrm{T})$ appear in the output stages of delay devices 10, one per filter cycle, during the N filter cycles following the cycle in which sample $x_k(n\mathrm{T})$ is applied to the filter. In the cycle after the application of sample $x_k(n\mathrm{T})$, sample $x_k((n-1)\mathrm{T})$ appears in the final stage of delay device 10(1). In the next cycle, sample $x_k((n-2)\mathrm{T})$ appears in the final stage of delay device 10(2). This continues until, N cycles after the application of sample $x_k(n\mathrm{T})$, the last sample, $x_k((n-\mathrm{N})\mathrm{T})$, relevant to the computation of output word $y_k(n\mathrm{T})$ appears in the final stage of the last delay device, 10(N). Since each of these samples is multiplied by the appropriate filter coefficient in the cycle in which it appears, the products which must be summed to produce $y_k(n\mathrm{T})$ have been generated one at a time over N+1 filter cycles. They are therefore summed, in accordance with the principles of this invention, as they are generated, i.e., by addition of each new product to a partial sum propagated by the alternating series of delay units 20 and two-input adders 22. In particular, the product of sample $x_k(n\mathrm{T})$ and coefficient $\mathrm{C}_{-(N/2),\,k}$ is generated by multiplier 14(0) and stored in partial sum delay device 20(0) during the cycle in which $x_k(n\mathrm{T})$ is applied to the filter. During the next filter cycle that product is applied to one input of two-input adder 22(1) as the product of sample $x_k((n-1)\mathrm{T})$ and coefficient $\mathrm{C}_{1\,-(N/2),k}$ is generated by multiplier 14(1) and applied to the other input of adder 22(1). The sum of these two products is stored in partial sum delay device 20(1) until the next filter cycle at which time it is applied to one input of two-input adder 22(2) to be combined with the product of sample $x_k((n-2)\mathrm{T})$ and coefficient $\mathrm{C}_{2\,-(N/2),k}$. This process continues with the cumulative partial sum propagating through delay devices 20 and adders 22 until, N cycles after the first product was formed, the final sum, $y_k(n\mathrm{T})$, is produced by adder 22(N). Since a sum of quantities which would otherwise have to be formed in one filter cycle can, by application of the principles of this invention, be formed cumulatively over several filter cycles, the digital filter configuration of this invention is appropriately termed the delayed-add configuration.

Although in the apparatus of this invention, the output word $y_k(n\mathrm{T})$ associated with an applied sample $x_k(n\mathrm{T})$ does not appear until N cycles after the cycle during which that sample was applied, the filter of this invention is no less efficient than prior art filters. This can be seen from a consideration of the utilization of multipliers 14. In both the prior art filters of FIGS. 1 and 2 and in the improved filter of FIG. 3 all of multipliers 14 operate simultaneously during each filter cycle to produce needed products. The difference is, of course, that in the filters of FIGS. 1 and 2, multipliers 14 operate to produce products needed for simultaneous summation whereas in the filter of FIG. 3 each product generated is added to a distinct partial sum. During any given filter cycle there are therefore N partial sums in storage in the N partial sum delay devices 20(0) through 20(N−1).

It should be noted that not only does the nonrecursive filter configuration of this invention eliminate the necessity for adding large numbers of simultaneously generated quantities, it also makes it possible to construct nonrecursive filters of any complexity using an appropriate number of identical serially connected filter modules, each module comprising a K+1 sample delay unit, a multiplier, a two-input adder, and a partial sum delay unit.

Figure 4:
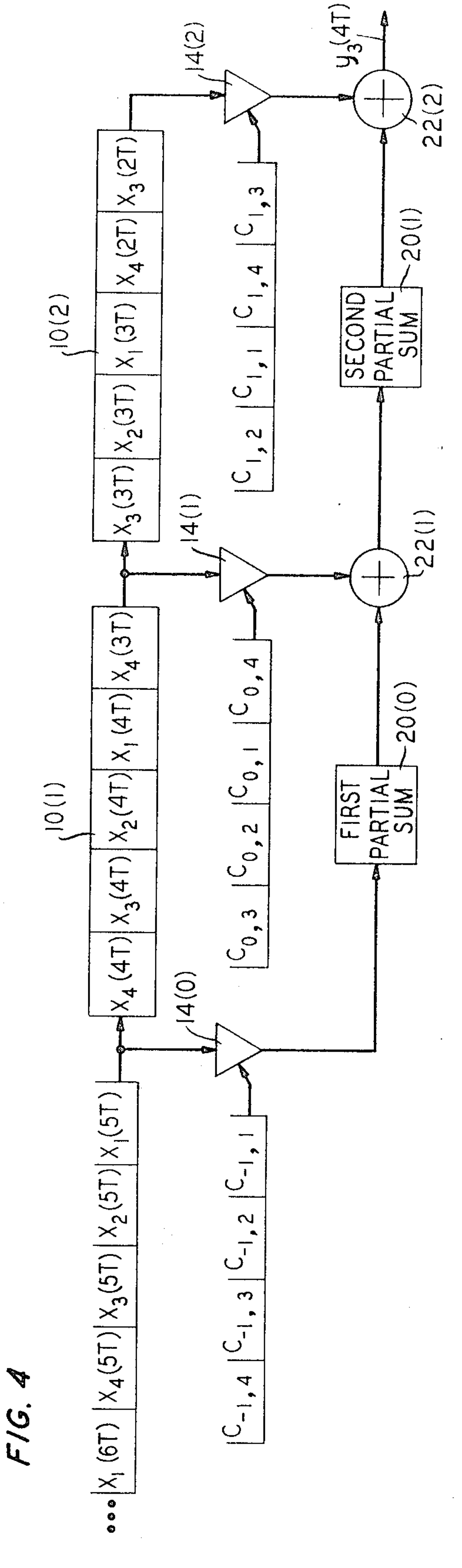
FIG. 4 is a block diagram of a three tap four-channel nonrecursive digital filter constructed in accordance with the principles of this invention.

FIG. 4 illustrates a particular digital filter constructed in accordance with the principles of this invention. The filter of FIG. 4 is a three tap filter designed to process data from four sources. It is shown at time $t$=5T, i.e., as sample $x_1$ (5T) is being applied to the filter. As that sample is multiplied by coefficient $C_{-1,1}$ in multiplier 14(0), sample $x_4$(3T) is multiplied by coefficient $C_{0,4}$ in multiplier 14(1) and sample $x_3$(2T) is multiplied by coefficient $C_{1,3}$ in multiplier 14(2). As the first of these products is formed, it will be stored in partial sum delay device 20(0), the former contents of device 20(0) being applied to one input of two-input adder 22(1). Adder 22(1) combines that quantity with the product generated by multiplier 14(2) and the result is applied to partial sum delay device 20(1), the former contents of that device being applied to one input of two-input adder 22(2) for combination with the product generated by multiplier 14(2) to produce output word $y_3$(4T). Either contemporaneously with the foregoing arithmetic operations or near the end of the filter cycle in which they are performed, shift registers 10(1) and 10(2), each of which has capacity for the simultaneous storage of K+1 or five samples, shift one sample or stage to the right, register 10(1) taking in sample $x_1$(5T) and displacing sample $x_4$(3T) and register 10(2) taking in sample $x_4$(3T) and displacing sample $x_3$(2T). In addition, the coefficients for use in each of the multipliers are circulated so that $C_{-1,2}$, $C_{o,1}$, and $C_{1,4}$ can be applied to multipliers 14(0), 14(1), and 14(2), respectively, in the next filter cycle.

To follow only the completion of the formation of output word $y_1$(5T), in the next filter cycle (i.e., at $t$=5T+$\tau$) sample $x_1$(4T), now in the output stage of shift register 10(1), is multiplied by coefficient $C_{0,1}$ and the product added to the product of $x_1$(5T) and $C_{-1,1}$ and stored in partial sum delay 20(0). The result of this addition is applied to partial sum delay 20(1). In the third and last cycle required for the formation of $y_1$(5T) (i.e., at $t$=5T+2$\tau$ and after the shift registers have again been shifted and the coefficients again circulated), sample $x_1$(3T), now in the output stage of shift register 10(2) is multiplied by coefficient $C_{1,1}$ in multiplier 14(2) is multiplied by and applied to adder 22(2) for addition to the quantity stored in partial sum delay 20(1). The resulting sum is, of course, output word $y_1$(5T).

Figure 5:
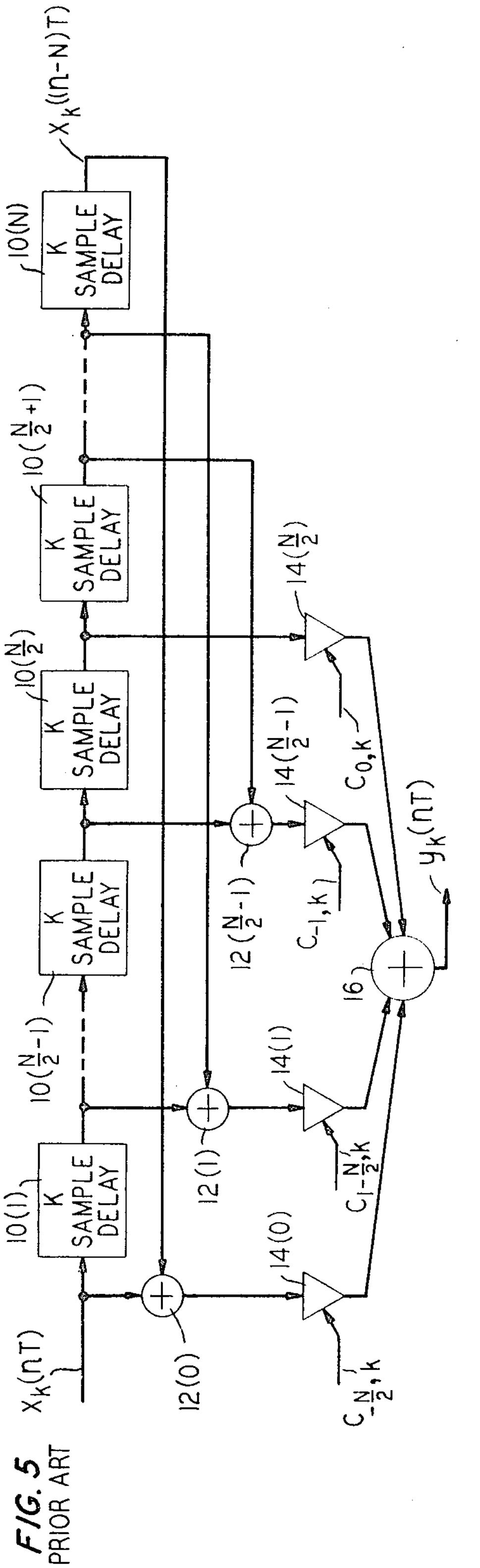
FIG. 5 PRIOR ART
FIG. 5 is a block diagram of a prior art K-channel nonrecursive digital filter suitable for realizing an even-symmetric transfer function.

FIG. 5 illustrates a well known modification which can be made to nonrecursive digital filters when the coefficients in each set of coefficients are symmetrical about the center time domain filter coefficient $C_{0,k}$. In that event, samples which are to be multiplied by symmetrically placed (and therefore equal) coefficients can be added before multiplication by a single coefficient with the value of the symmetrical coefficients. Thus in FIG. 5, samples $x_k$nT) and $x_k((n-N)T)$ which would otherwise be multiplied by coefficients $C_{-(N/2),k}$ and $C_{N/2,k}$, respectively, can, when these coefficients are equal, instead be added by adder 12(0) and the sum multiplied by coefficient $C_{-(N/2),k}$. The same pre-multiplication addition being possible for all symmetrically placed samples, the number of simultaneously generated products which must be summed in adder 16 is reduced by nearly one-half. Where the coefficients are odd-symmetric rather than even-symmetric, pre-multiplication subtractions can be used in place of pre-multiplication additions with the same result. Despite the reduction in the number of quantities applied to adder 16, it is still advantageous to avoid having to form such a sum in one filter cycle.

Figure 6:
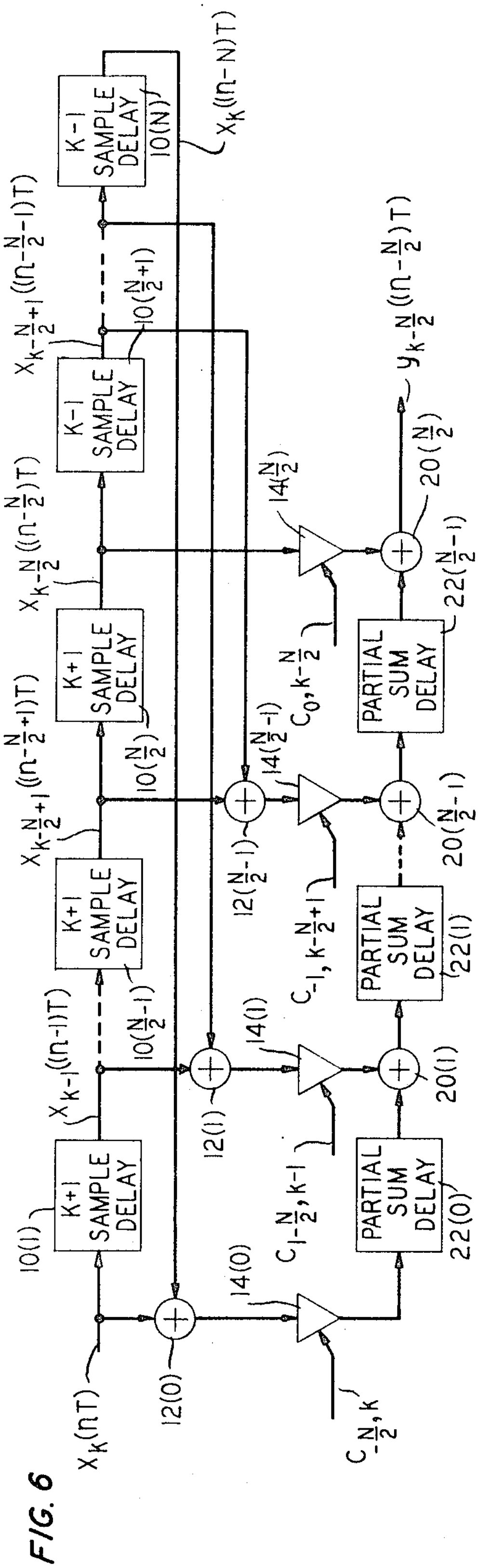
FIG. 6 is a block diagram of a K-channel nonrecursive digital filter suitable for realizing an even-symmetric transfer function and constructed in accordance with the principles of this invention.

Accordingly, FIG. 6 shows how the filter of FIG. 5 can be modified in accordance with the principles of this invention to eliminate the large simultaneous summation that would otherwise be required. With the addition of adders 12, the filter of FIG. 6 is identical to the filter of FIG. 3 up to and including center (k+1)-sample delay device 10(N/2) and its associated multiplier 14(N/2) and two-input adder 20(N/2). Sample delay units beyond that, however, each introduce only K−1 cycle intervals of delay, that is, one less filter cycle interval of delay than the corresponding devices in prior art filters and two fewer filter cycle intervals of delay than the corresponding devices in the filter of FIG. 3. Thus the additional delays introduced by (K+1)-sample delay devices 10(1) through 10(N/2) are gradually recovered in (K−1)-sample delay devices 10(N/2+1) through 10(N). Accordingly, the samples appearing in the output stages of shift registers 10(N/2 + 1) through 10(N) in any given filter cycle are appropriate for pre-multiplication addition to the sample applied to the filter and to those samples appearing in the output stages of registers 10(1) through 10(N/2 − 1) in that filter cycle. Since the products formed from these combined samples are in other respects similar to those generated by multipliers 14(0) through 14(N/2) of FIG. 3, they can be summed to produce the required output signal $y$ by the same kind of apparatus used in FIG. 3, i.e., an alternating series of two-input adders 20 and partial sum delay devices 22. It will be understood that adders 12 can be made to perform subtractions in the event that the required coefficients are odd-symmetric rather than even-symmetric.

It has been mentioned that use of the delayed-add configuration increases the overall delay of a nonrecursive digital filter. In some applications (e.g., where the filter is part of a real-time control system) such increased delay may be undesirable. It is possible, however, to realize the advantages of the delayed-add configuration to a significant degree without introducing the full measure of overall delay characteristic of delayed-add filters of the type shown generally in FIGS. 3 and 6. By applying the delayed-add principle to selected filter sections as shown generally in FIG. 7, the large simultaneous additions of prior art filters can be broken down into convenient partial summations at the cost of only a fraction of the overall delay of the filters of FIGS. 3 and 6.

Figure 7:
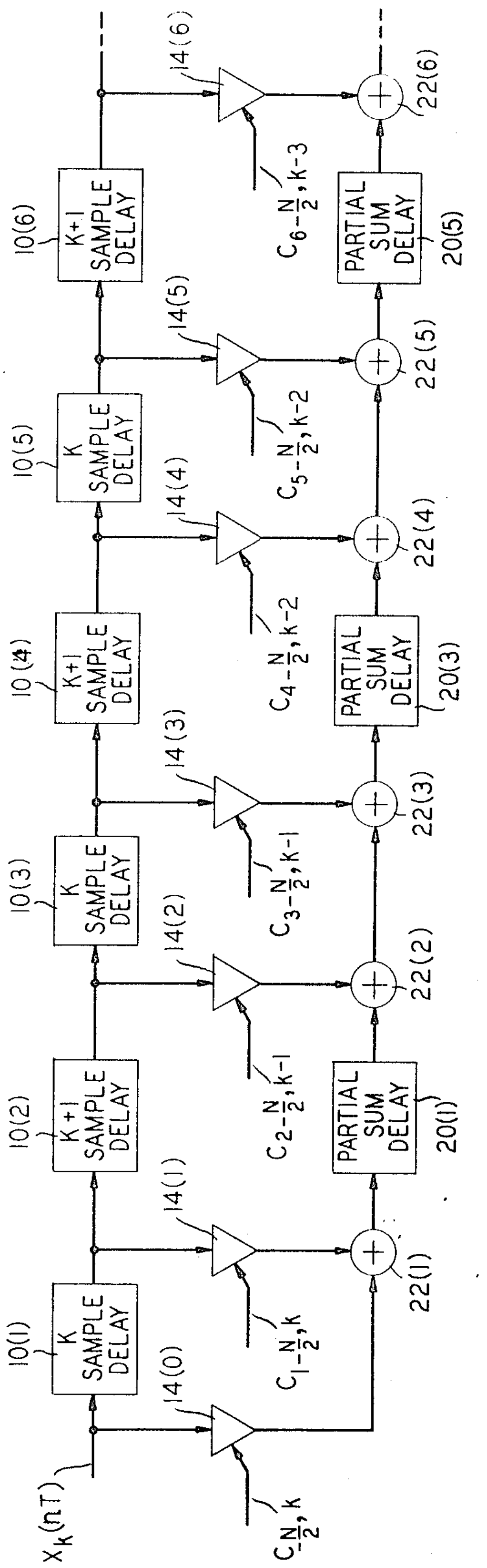
FIG. 7 is a block diagram of a filter of the type shown in FIG. 3 further modified in accordance with the principles of this invention to reduce overall filter delay.

In the filter of FIG. 7, only every other sample delay unit (i.e., delay units 10(2), 10(4), 10(6), et cetera) has the added interval of delay characteristic of the delayed-add configuration. Of course, other arrangements are also possible. Associated with each such delay unit is a partial sum delay unit (i.e., delay units 20(1), 20(3), 20(5), et cetera), also characteristic of the delayed-add configuration. The K-sample delay units, 10(1), 10(3), 10(5), et cetera, have no associated partial sum delay units. Accordingly, the samples appearing simultaneously in the output stage of any given (K+1)-sample delay unit (e.g., delay unit 10(2)) and the following K-sample delay unit (e.g., delay unit 10(3)) are both relevant to the formation of a given output word. The products based on those samples (e.g., those computed by multipliers 14(2) and 14(3)) are therefore summed together with any relevant previously generated partial sum (e.g., that stored in delay units 20(1)) to produce a partial sum which is applied to and stored in the partial sum delay unit associated with the next (K+1)-sample delay unit (e.g., delay unit 20(3)). Assuming that there is more than one set of filter coefficients C being used, the sequence in which they must be applied to the several multipliers of the filter is obvious from FIG. 7 and from the foregoing discussion.

Viewed another way, the filter of FIG. 7 comprises several simple serially connected nonrecursive filter subsections, each of which subsections includes a subset of the delay devices and the associated arithmetic units and has a configuration similar to that of prior art K-channel nonrecursive filters. By the practice of this invention, the output words produced by each subsection are delayed for one filter cycle by one of partial sum delay units 20 before being applied to the adder of the next filter subsection. Samples, having been delayed for K filter cycles by the delay unit 10 of each filter subsection, are delayed for an additional K+1 filter cycle by one of (K+1)-sample delay units 10 before being applied to the delay units of the next filter subsection.

As compared with the filter configuration of FIG. 3, use of the filter configuration of FIG. 7 results in only one-half as much overall delay for filters of comparable complexity. Yet the maximum number of quantities which must be simultaneously added has been increased from two to only three. It will be recognized that the overall delay of delay-add filters can be further reduced by employing even more widely spaced partial sum delay units. By employing (K+1)-sample delay units for every third sample delay device, for example, overall delay can be reduced to approximately one-third the delay characteristic of using such units for each delay device. This is done, of course, at the expense of having to form larger partial sums. Thus where (K+1)-sample delay units are employed for every third sample delay device, each partial sum will in general involve summing four simultaneously generated quantities. It will also be clear that this principle is equally applicable to filters of the type shown generally in FIG. 6.

It is to be understood that the embodiments shown as described herein are illustrative of the principles of this invention only. In particular, the principles of this invention are applicable to any digital or analog signal processing systems, e.g., sampled data filters and transversal equalizers, having configurations similar to the nonrecursive digital filters discussed above. It is to be further understood that modifications can be made by those skilled in the art without departing from the spirit and scope of the invention. For example, any spacing of partial sum delay units can be employed in the filter of FIG. 7 as discussed above.

What is claimed is:

1. Apparatus for algebraically combining a predetermined number of weighted signal samples from each of (K) sources, said samples being applied to said apparatus in a predetermined sequence, there being a predetermined interval of time between the application of any two of said samples, comprising:

an ordered plurality of serially connected multistage shift registers each producing a series of output signal samples each of which is (K+1) samples earlier in said sequence of applied signal samples than the output signal sample concurrently produced by the preceding one of said shift registers;

a plurality of multipliers, each solely associated with one of said shift registers, each producing a series of output signal words, each of which is the product of one of said output signal samples of said associated shift register and a predetermined filter coefficient;

a plurality of adders, each solely associated with one of said shift registers, for adding each of said output words of said multiplier associated with said associated shift register and an applied delayed partial sum word to produce a partial sum output signal word;

a plurality of partial sum output word delay units, each solely associated with one of said shift registers, for delaying each of said partial sum output words of said adder associated with said shift register for said predetermined interval of time between samples; and means for applying each of the delayed partial sum output words produced by each of said partial sum delay units to the adder associated with the next of said ordered shift registers.

2. Nonrecursive digital filtering apparatus for performing predetermined arithmetic operations on sequentially applied digitally coded signal samples from each of K sources, there being a predetermined interval of time between the application of any two of said samples, comprising:

a plurality of serially connected filter modules, each module further comprising:

a sample delay unit for delaying each sample applied to it by the time required for the application of (K+1) samples to said filter;

a multiplier for multiplying each of said delayed samples by a predetermined filter coefficient;

an adder for adding each of said multiplied samples to an applied delayed partial sum signal word to produce a partial sum output signal word; and a partial sum delay unit for delaying each of said partial sum output signal words by said interval of time between applied samples;

means for applying said delayed samples of each of said filter modules to said sample delay unit of the next module; and means for applying said delayed partial sum words of each of said filter modules to said adder of said next filter module.

3. Nonrecursive digital filter apparatus including a plurality of serially connected means for sequentially delaying digitally coded signal samples from each of a plurality of sources applied to the filter at a predetermined rate, the reciprocal of which is the filter cycle interval, and means for multiplying each of the applied and delayed samples by a predetermined filter coefficient wherein the improvement comprises:

an additional filter cycle interval of delay associated with each of said serially connected means;

a plurality of serially interconnected adders for adding said multiplied samples to produce a digitally coded output signal; and a plurality of partial sum delay units, one of which is included in each adder interconnection, for delaying the output signal of each adder by one sample period before applying it to the next of said adders.

4. A nonrecursive digital filter for processing sequentially applied digitally coded signal samples from each of (K) signal sources comprising:

a plurality of shift registers connected in series forming an ordered set of shift registers, each of said shift registers having capacity for the simultaneous storage of (K + 1) signal samples;

a plurality of multiplier devices, each responsive to the output signal of one of said shift registers for generating an output signal representative of the product of the quantity represented by said shift register output signal and a filter coefficient quantity;

a plurality of adder devices and storage devices connected in alternating series, said adders in said alternating series forming an ordered set of adder devices corresponding to said ordered set of shift registers, each one of said adder devices being responsive to said output signal of the one of said multipliers associated with the corresponding shift register in said ordered set of shift registers for generating an output signal representative of the sum of said multiplier output signal and the output signal of the preceding storage device in said alternating series, each of said storage devices having capacity for the storage of one of said signal sums; and means responsive to the output signal of one of said adders for providing a filtered output signal.

5. Nonrecursive digital filtering apparatus for processing digitally coded signal samples from each of K sources, said samples being sequentially applied at a predetermined rate the reciprocal of which is the filter cycle interval, comprising:

a tapped delay line for delaying said sequentially applied samples, said delay line having a plurality of taps spaced apart on said delay line by (K + 1) sample periods;

a plurality of multipliers, one of which is associated with each of said taps, for multiplying the samples applied to each of said taps by predetermined filter coefficients;

a plurality of adders, one of which is associated with each of said taps, for adding the multiplied samples produced by the multiplier associated with each of said taps and a series of applied delayed partial sum words to produce a series of partial sum output words;

a plurality of partial sum delay units, one of which is associated with each of said taps, for delaying said partial sum output words produced by the adder associated with each of said taps by one sample period to produce a series of delayed partial sum output words; and means for applying said delayed partial sum output words produced by each of said partial sum delay units to the adder associated with the next of said taps.

6. Nonrecursive digital filtering apparatus for convolving sequentially applied digitally coded signal samples from each of (K) sources with a symmetrical set of N + 1 time domain filter coefficients, said samples being applied to said apparatus at a predetermined rate, the reciprocal of which is the filter cycle interval, comprising:

a tapped delay line for delaying said sequentially applied samples, said delay line having N+1 taps each of those up to and including the center tap being separated from the preceding tap by a (K+1) sample period delay and each of the remaining taps being separated from the preceding tap by a (K—1) sample period delay;

a first plurality of adders, one of which is associated with each pair of taps which are symmetrically located along said delay line with respect to said center tap for pairwise addition of said samples applied to said symmetrical pair of taps;

a plurality of multipliers, one of which is associated with each of said first plurality of adders for multiplying said added samples by a predetermined filter coefficient;

a center tap multiplier associated with said center tap for multiplying samples applied to said center tap by a predetermined filter coefficient;

a second plurality of adders, one of which is associated with each of said multipliers for adding said multiplied samples to a series of applied delayed partial sum signal words to produce a series of output partial sum signal words;

a plurality of partial sum delay units, one of which is associated with each of said second plurality of adders for delaying each word in said series of output sum words by one sample period to produce a series of delayed partial sum words; and means for applying said series of delayed partial sum words produced by each of said partial sum delay units associated with one of said pairs of symmetrical taps to the one of said second plurality of adders associated with said pair of symmetrical taps next closet to said center tap and for applying said series of delayed partial sum words produced by said partial sum delay unit associated with said symmetrical taps adjacent to said center tap to said one of said second plurality of adders associated with said center tap.

7. Nonrecursive digital filtering apparatus including at least two nonrecursive filter subsections for processing sequentially applied digitally coded signal samples from each of (K) sources, said samples being applied to said apparatus at a predetermined rate the reciprocal of which is the filter cycle interval, wherein the improvement comprises:

means for delaying for (K+1) filter cycle intervals said samples delayed by each of said filter subsections before applying said samples to the next of said filter subsections; and means for delaying the filtered output words produced by each of said filter subsections for one filter cycle interval before summation of said output words with the output words produced by the next of said filter subsections.

8. Nonrecursive digital filtering apparatus for performing predetermined arithmetic operations on sequentially applied digitally coded signal samples from each of (K) sources comprising:

a plurality of serially interconnected shift registers for successively delaying said applied signal samples, at least one of said shift registers having capacity for the simultaneous storage of (K+1) signal samples, the remainder of said shift registers having capacity for the simultaneous storage of (K) signal samples, each group of said K-sample shift registers which are interconnected comprising one of a plurality of subsets of said shift registers;

a plurality of multipliers, one of which is connected to each of said shift register interconnections, for producing a plurality of digitally coded product words each of which is representative of the product of one of said delayed signal samples and a predetermined filter coefficient;

a plurality of partial sum delay units, each of said delay units being associated with one of said subsets of K-sample shift registers and each having capacity for the storage of one applied digitally coded partial sum word;

a plurality of adder means, one of which is associated with each of said subsets of K-sample shift registers for applying to the one of said partial sum delay units associated with said subset of K-sample delay units a digitally coded partial sum word representative of an algebraic combination of said product words produced by those of said multipliers connected to each of said interconnections of each of said K-sample shift registers comprising said subset and said partial sum word stored in said partial sum delay unit associated with the preceding subset of K-sample delay units; and means responsive to the output signal of one of said adders for providing a filtered output signal.

* * * * *